United States Patent [19]

Ohniwa et al.

[11] 4,312,583
[45] Jan. 26, 1982

[54] ELECTROMAGNETICALLY DRIVEN SHUTTER DEVICE

[75] Inventors: Takehiko Ohniwa, Chichibu; Yoji Sugiura, Yokohama, both of Japan

[73] Assignees: Canon Kabushiki Kaisha; Canon Denshi Kabushiki Kaisha, both of Tokyo, Japan

[21] Appl. No.: 217,038

[22] Filed: Dec. 16, 1980

[30] Foreign Application Priority Data

Dec. 19, 1979 [JP] Japan ............................ 54-175840[U]

[51] Int. Cl.³ .............................................. G03B 9/08
[52] U.S. Cl. ..................................... 354/234; 354/252
[58] Field of Search ........................ 354/234, 235, 252

[56] References Cited

U.S. PATENT DOCUMENTS 3,953,871  4/1976  Borchard et al. .................. 354/252

Primary Examiner—Michael L. Gellner
Attorney, Agent, or Firm—Toren, McGeady & Stanger

[57] ABSTRACT

An electromagnetic device for driving a shutter includes a moving coil which is arranged to rotate in the magnetic field of a stator. A current supply arrangement for supplying exciting current to the moving coil includes a pair of insulated side pieces fixed about the rotational axis of the coil and connected to both terminals of the moving coil, and a pair of elastic rod-shaped brushes pressed against the side pieces on diametrically opposite sides of the rotational axis. A slide surface on each slide piece is provided with at a pair of flatened portions against which the elastic rod-shaped brushes are pressed so as to hold the shutter blades at a stop position.

3 Claims, 4 Drawing Figures

ELECTROMAGNETICALLY DRIVEN SHUTTER DEVICE

BACKGROUND OF THE INVENTION

The present invention relates to an electromagnetically driven shutter device for opening and closing the shutter blades of a camera, and particularly to a driving device for an electromagnetically driven shutter having a current supply arrangement for supplying driving current to an electromagnetic driving source. The driving device is constructed so that the shutter blades stop at a predetermined position in a stable state.

Various types of driving devices for opening and closing shutter blades are used, wherein the device of most simple construction is the electromagnetic driving device. In such device, a moving coil is arranged in the magnetic field of a stator consisting of a permanent magnet or the like. An exciting current is supplied to the coil so as to rotate the coil and thereby drive the shutter blades by making use of the torque developed by the coil.

Further, in a camera having an electromagnetically driven shutter device, since the blades are not mechanically restricted before taking a picture until the device is driven by an exciting current, the shutter blades are then arranged to move freely without any restriction. Therefore, there is a danger that the shutter blades might move due to vibration or shock, and allow a light beam to leak into the camera. Further, unless the blades are always held at the same position before starting to open, a stable and exact exposure time cannot be obtained. Moreover, before the blades have opened, the current supply to the electromagnetic driving source generally is interrupted in order to save power consumption. Accordingly, a braking or holding mechanism is required to prevent free movement of the shutter blades at such time.

In order to prevent free movement of the shutter blades as described above, it is sufficient to provide a mechanism for braking the rotational movement of the moving coil in the electromagnetic driving source at both ends of the path of angular movement through which the shutter driving part must swing, namely, at the start end and at the running termination end. A method, thus, is known wherein at both ends of the path of movement, a permanent magnet is provided so as to attract the blades. Accordingly, more members are needed and such is not economically feasible with regard to manufacturing costs and assembly space.

Further, before the blades have run, the current supply to the electromagnetic driving source is generally interrupted in order to save the power consumption so that the braking holding means is necessary in order to prevent the free movement of the shutter blades.

In order to prevent the free movement of the shutter blades as mentioned above, it is sufficient to provide the both ends of the angle necessary for the shutter driving part to swing between, namely at the start side and at the running termination side, with a mechanism for giving a braking effect to the rotation of the moving coil of the electromagnetic driving source. Hereby, there is a method that at the both end a permanent magnet is provided so as to attract the blades, whereby more members are needed, which is not profitable in the manufacturing cost and the assembling space.

SUMMARY OF THE INVENTION

An object of the present invention is to eliminate unsteadiness of shutter blades in an electromagnetically driven shutter device at either the starting position or the end position of the running path of the shutter blades.

Another object of the present invention is to obtain an exact and stable exposure time by securing the shutter blades of the electromagnetically driven shutter at a starting position and at an end of running position.

Another object of the present invention is to provide an electromagnetically driven shutter device having shutter blades which can be controlled by an arrangement of simple construction.

In accordance with an embodiment of the present invention, a shutter blade driving shaft is arranged to be held by friction at either a starting position or a termination position of shutter blades in a electromagnetically driven shutter, so that a stable exposure time can be obtained with a simple construction.

In another embodiment of the present invention, a cam has a lift which varies in accordance with the rotational displacement of a rotating shaft of an electromagnetic driving member, and slide members are always in elastic contact with the cams, so that the friction exerted on the shaft is controlled in accordance with the rotational position of the rotating shaft by a simple construction.

In yet another embodiment of the present invention, current is supplied to the electromagnetic driving member by means of brush type contacts, which contacts also serve as the above-mentioned slide members, so that the construction is simplified.

In accordance with an embodiment of the present invention, the shutter blade driving shaft is held by friction at the time of the starting and/or the termination of the shutter blades of the electromagnetically driven shutter so that a stabilized exposure time can be obtained by means of a simple construction.

In case of another embodiment of the present invention, a cam whose lift changes in accordance with the rotation displacement of the rotation shaft of the electromagnetic driving member is provided, while slide members which are always in elastic contact with the cams are provided, so that the above-mentioned friction can be controlled by means of a simple construction in accordance with the rotation phase of the rotation shaft.

In case of further another embodiment of the present invention, the current supply to the electromagnetic driving member is made by means of the brush type contacts, which serves at the same time as the above-mentioned slide contact members, so that the construction can be simplified.

DESCRIPTION OF THE PREFERRED EMBODIMENTS

Figure 1:
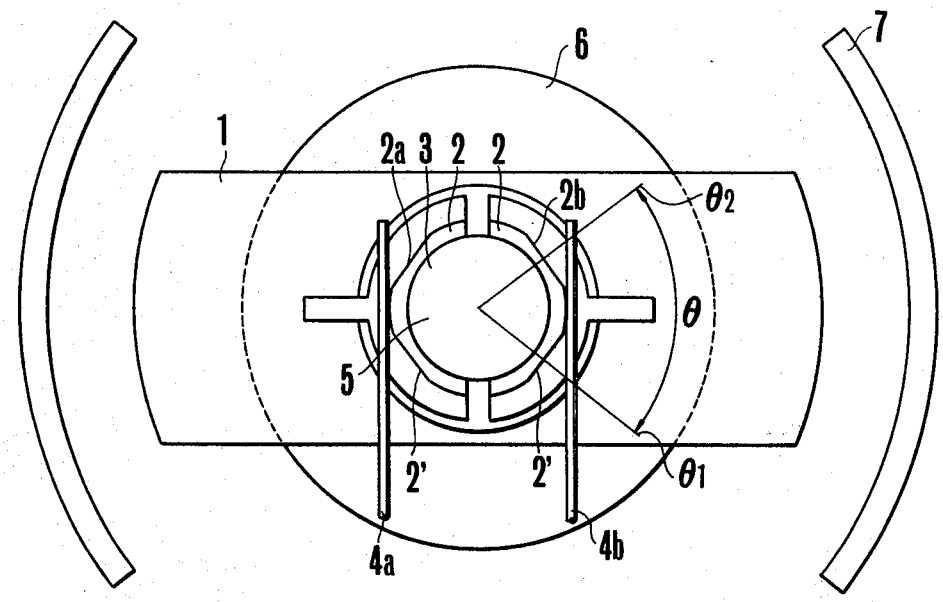
FIG. 1 shows the first embodiment of the electromagnetically driven shutter device of the present invention in front view.

FIG. 1 shows an embodiment of the current supply part of an electromagnetically driven shutter in accordance with the present invention.

In the drawing, a moving coil 1 is provided around a spool not shown in the drawing. Further, this moving coil 1 is fixed on a non-conductive shaft 5. The shaft 5 is rotatable with reference to the camera. Inside of this coil 1 and the spool, a cylindrical permanent magnet 6 which is radially magnetized is fixed on the camera. Further, outside of the coil 1 a fixed yoke 7 is arranged. Hereby, a stationary magnetic field is formed by means of the yoke 7 and the above-mentioned permanent magnet 6.

With the construction described above, when a current is supplied to the coil 1 along a certain determined direction, the conductor components in the coil 1 along the axis of shaft 5 receive a force couple in such a manner that the coil 1 and the shaft 5 are rotated as one body. Such an arrangement is already known for ammeters or the like.

In accordance with the present invention, conductor pieces 2a and 2b are insulated from each other and are arranged diametrically oppositely around the axis of shaft 5. The conductor pieces are normally in elastic contact with conductive brushes 4a and 4b. The surfaces of the conductor pieces 2a and 2b, which surfaces are in contact with the brushes 4a and 4b, are in the form of cam faces 2′, as shown in FIG. 1.

Further, by means of a stopper not shown in the drawing, the rotation range of the coil 1 is limited to the angle $\theta$ between the positions $\theta 1$ and $\theta 2$, in such a manner that the brush 4a is in contact only with the conductor piece 2a, while the brush 4b is in contact only with the conductor piece 2b. Further, along with the displacement of the shaft 5 from $\theta 1$ to $\theta 2$, the shutter blades connected to the shaft 5 are brought out of the closed state into the totally opened state.

Consequently, the rotational position of the coil shown in FIG. 1 corresponds to the state in which the shutter blades have reached the middle of their course.

Further, the cam-shaped conductor pieces 2a and 2b are so formed that the cam lift is smallest at the starting position of rotation $\theta 1$, and at the end position of rotation $\theta 2$ so that the friction between the conductor pieces and the brushes are smallest at the positions $\theta 1$ and $\theta 2$. Therefore, when the current supply to the coil is interrupted after the coil has reached these positions the coil 1 is held at $\theta 1$ or $\theta 2$ even without an additional holding arrangement.

Further, the positions $\theta 1$ and $\theta 2$ can be ones at which the shutter blades are somewhat past the end of the course from the closed state to the opened state. Namely, the angle $\theta$ can be set somewhat larger than what is necessary for the shutter blades to run when making an exposure.

In the present embodiment the terminals of the coil 1 are respectively connected to the conductor pieces 2a and 2b, while the brushes 4a and 4b are respectively connected to output terminals of a conductivity control circuit which is not shown in the drawing. Accordingly, the current supply arrangement for the coil is serves as a holding member in accordance with the present invention, which makes the construction remarkably simple.

Figure 2:
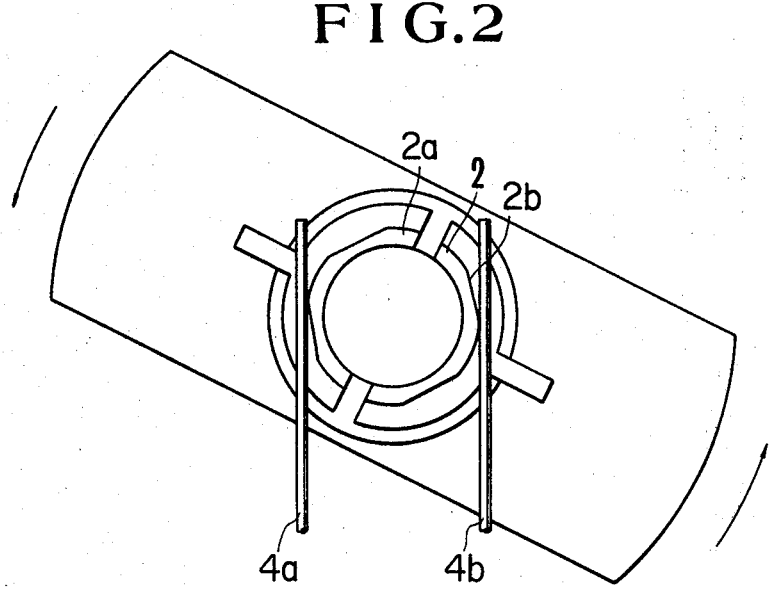
FIG. 2 also shows the embodiment shown in FIG. 1, whereby the device is rotated by a certain determined angle.

FIG. 2 shows a state in which a current is supplied to the present embodiment of the coil along a certain determined direction, so as to rotate the coil 1 by a certain determined angle.

In the state shown in FIG. 2, the shutter blades (not shown) have reached the neighborhood of the end of their path of movement. Further, the brushes 4a and 4b are on the falling down part of the cam surfaces on the conductor pieces 2a and 2b so that near the end of the path there is a tendency to swing beyond the angle at that position.

In accordance with the present invention, the shutter blades are prevented from moving freely, making use of the above-mentioned construction.

In case the above-mentioned holding effect is desired only at the start position of the path, it is sufficient to make the cam surface in the region of the end position of the circular path. It is also possible to make the holding effect be realized only in the region of the end position of the path.

Figure 3:
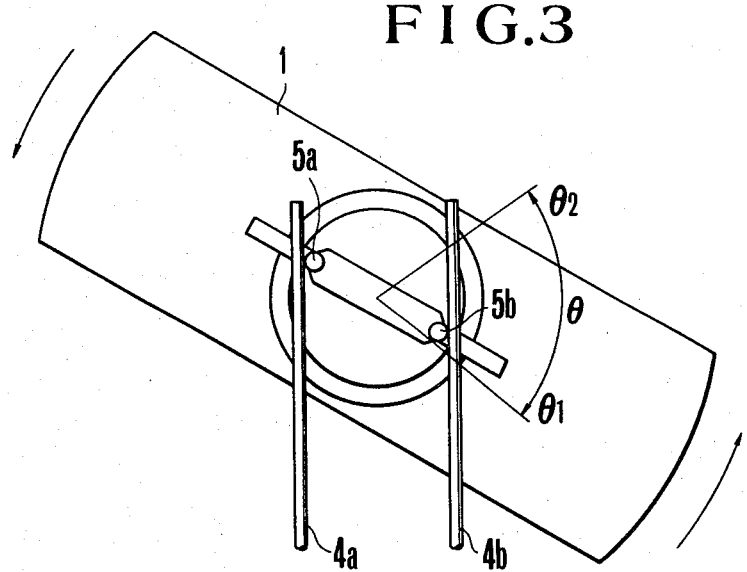
FIG. 3 shows the second embodiment of the electromagnetically driven shutter device of the present embodiment.

FIG. 3 shows another embodiment of the electromagnetic driving device in accordance with the present invention in plane view. As is shown in the drawing, the conductor piece 2 is not made circular but is composed of a pair of pins 5a and 5b, which are sandwiched by two elastic rod-shaped brushes 4a and 4b. Accordingly a similar braking effect to that of the device shown in FIGS. 1 and 2 can be obtained.

Figure 4:
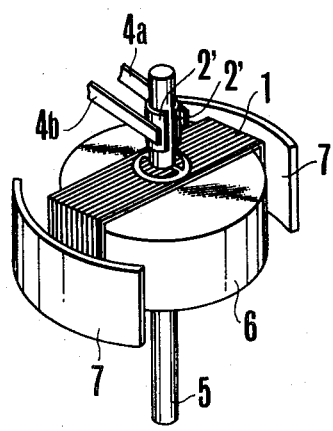
FIG. 4 shows the embodiment shown in FIGS. 1 and 2 in perspective view.

FIG. 4 shows the electromagnetically driven shutter shown in FIGS. 1 and 2 in perspective view.

As explained above in the electromagnetic device for driving a shutter in accordance with the present invention, the current supply arrangement for supplying current to a moving coil is so shaped that free movement of the electromagnetic driving device is limited while the shutter is standing still and when the power source is switched off. Further, although in the present embodiment, the moving coil type of shutter drive is shown, it goes without saying that it can be replaced with a moving magnet type, in which case, it is not necessary to make use of the conductor pieces, and the brushes which then can be substituted with non-conductive members. Further, even in the moving coil type, it is also possible to obtain the same effect from a non-conductive cam and brushes.

What is claimed is:

1. An electromagnetically driven shutter for opening and closing a photographing optical path in a camera, comprising:
    (a) electromagnetic driving means including a shaft for driving shutter blades over a path of movement between a start position corresponding to a closed state and an end position corresponding to a totally open state, a permanent magnet and a conductor always arranged in the magnetic field of the permanent magnet wherein a selected one of the conductor and the permanent magnet is fixed on the shutter and the other one is mounted for rotational movement with the shaft, the magnetic field of the permanent magnet and the relative position of the conductor are such that either one of the conductor and the permanent magnet is rotated within a certain angle range about the axis of the shaft when current is supplied to the conductor along a certain direction;
    (b) at least one shutter blade operatively engaged with the shaft of the electromagnetic driving means to open and close the photographing optical path;

(c) cam means mounted for rotational movement with the shaft of the electromagnetic driving means for providing a cam surface having a cam lift which varies relative to the axis of the shaft in accordance with angular position about the axis of the shaft; and (d) slide contact means in elastic contact with the cam surface for holding the shaft of the electromagnetic driving means by friction wherein the cam lift of the cam surface is determined so that the magnitude of the friction is smaller in the region of the end position of the shutter blades.

2. An electromagnetically driven shutter in accordance with claim 1, wherein the cam means includes two conductor pieces and means for insulating the conductor pieces from each other, the conductor pieces being respectively electrically connected to both terminals of the conductor in the electromagnetic driving means, and the slide contact means comprises two conductive brushes connected to a power source for contacting the conductor pieces.

3. An electromagnetically driven shutter in accordance with claim 1, wherein the shaft of the electromagnetic driving means is arranged for rotation about the axis of the shaft over an angular range which is slightly larger than the corresponding range of movement of the shutter blades out of the closed state into the totally open state.

* * * * *